(12) United States Patent  (10) Patent No.: US 8,127,558 B2
Bland et al.  (45) Date of Patent: Mar. 6, 2012

(54) GAS TURBINE ENGINE ADAPTED FOR USE IN COMBINATION WITH AN APPARATUS FOR SEPARATING A PORTION OF OXYGEN FROM COMPRESSED AIR

(75) Inventors: Robert J. Bland, Oviedo, FL (US); Dennis A. Horazak, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1461 days.

(21) Appl. No.: 11/848,544

(22) Filed: Aug. 31, 2007

(65) Prior Publication Data
US 2009/0060729 A1   Mar. 5, 2009

(51) Int. Cl.
  *F02C 3/26*   (2006.01)
  *F02C 6/10*   (2006.01)
(52) U.S. Cl. .............. 60/784; 60/785; 60/39.12; 60/752
(58) Field of Classification Search .................... 60/782, 60/784, 785, 39.12, 752
  See application file for complete search history.

(56) References Cited

U.S. PATENT DOCUMENTS

| | | | |
|---|---|---|---|
| 5,161,367 A * | 11/1992 | Scalzo ......................... | 60/39.12 |
| 5,386,686 A * | 2/1995 | Chretien et al. ................ | 60/784 |
| 5,657,624 A | 8/1997 | Kang et al. | |
| 5,852,925 A * | 12/1998 | Prasad et al. .................... | 60/783 |
| 5,865,878 A | 2/1999 | Drnevich et al. | |
| 5,950,417 A * | 9/1999 | Robertson et al. ........... | 60/39.23 |
| 6,116,013 A | 9/2000 | Moller | |
| 6,948,318 B2 * | 9/2005 | Peyron ........................... | 60/785 |
| 2004/0011057 A1 | 1/2004 | Huber | |

* cited by examiner

*Primary Examiner* — Ted Kim

(57) ABSTRACT

A gas turbine engine is provided comprising an outer shell, a compressor assembly, at least one combustor assembly, a turbine assembly and duct structure. The outer shell includes a compressor section, a combustor section, an intermediate section and a turbine section. The intermediate section includes at least one first opening and at least one second opening. The compressor assembly is located in the compressor section to define with the compressor section a compressor apparatus to compress air. The at least one combustor assembly is coupled to the combustor section to define with the combustor section a combustor apparatus. The turbine assembly is located in the turbine section to define with the turbine section a turbine apparatus. The duct structure is coupled to the intermediate section to receive at least a portion of the compressed air from the compressor apparatus through the at least one first opening in the intermediate section, pass the compressed air to an apparatus for separating a portion of oxygen from the compressed air to produced vitiated compressed air and return the vitiated compressed air to the intermediate section via the at least one second opening in the intermediate section.

20 Claims, 4 Drawing Sheets

GAS TURBINE ENGINE ADAPTED FOR USE IN COMBINATION WITH AN APPARATUS FOR SEPARATING A PORTION OF OXYGEN FROM COMPRESSED AIR

This invention was made with U.S. Government support under Contract Number DE-FC26-98FT40343 awarded by the U.S. Department of Energy. The U.S. Government has certain rights to this invention.

FIELD OF THE INVENTION

The present invention is directed to a gas turbine engine adapted for use in combination with an apparatus for separating a portion of oxygen from compressed air.

BACKGROUND OF THE INVENTION

In a known gas turbine engine, up to about 19% of air flow passing through a compressor apparatus of the gas turbine engine may be extracted. A piping system is provided for extracting the compressed air from the compressor apparatus. The piping system comprises a first set of four pipes circumferentially spaced apart about the compressor apparatus and axially located between sixth and seventh stages of the compressor apparatus and a second set of four pipes circumferentially spaced apart about the compressor apparatus and axially located between eleventh and twelfth stages of the compressor apparatus. The air may be extracted for any of several reasons, such as to remove a portion of the compressed air during startup to avoid compressor apparatus surge; provide cooling air for hotter sections of the gas turbine engine during normal operation; provide oxidizing air for an air-blown gasifier in an air-blown Integrated Gasification Combined Cycle (IGCC) plant; provide compressed air to a cryogenic air separation plant to produce oxygen for an oxygen-blown gasifier in an oxygen-blown IGCC plant.

U.S. Pat. No. 5,657,624, the entire disclosure of which is incorporated by reference herein, teaches using an ion transport membrane system in combination with a combustion turbine system so as to remove a portion of oxygen from compressed air supplied by a compressor apparatus forming part of the combustion turbine system.

A system is desired for extracting more than 20% of air flowing through a compressor apparatus or an intermediate section of a gas turbine engine without requiring lengthening of a rotor shaft extending between the compressor apparatus and a turbine apparatus of the gas turbine engine.

SUMMARY OF THE INVENTION

In accordance with a first aspect of the present invention, a gas turbine engine is provided comprising an outer shell, a compressor assembly, at least one combustor assembly, a turbine assembly and duct structure. The outer shell includes a compressor section, a combustor section, an intermediate section and a turbine section. The intermediate section is located between the combustor section and the turbine section and includes at least one first opening and at least one second opening. The compressor assembly is located in the compressor section to define with the compressor section a compressor apparatus to compress air. At least one combustor assembly is coupled to the combustor section to define with the combustor section a combustor apparatus to receive compressed air and a fuel, combine the air and fuel to create an air/fuel mixture and ignite the air/fuel mixture to create combustion products. The turbine assembly comprises a plurality of stationary vanes, a plurality of rotatable blades and a rotatable shaft and disc assembly coupled to the blades. The turbine assembly is located in the turbine section to define with the turbine section a turbine apparatus to receive the combustion products from the combustor apparatus such that the combustion products expand in the turbine apparatus causing the blades and shaft and disc assembly to rotate. The duct structure is coupled to the intermediate section to receive at least a portion of the compressed air from the compressor apparatus through at least one first opening in the intermediate section, pass the compressed air to an apparatus for separating a portion of oxygen from the compressed air to produce vitiated compressed air and return the vitiated compressed air to the intermediate section via at least one second opening in the intermediate section.

The duct structure may comprise a compressed air plenum coupled to the outer shell so as to communicate with at least one first opening in the intermediate section of the outer shell and a vitiated air plenum coupled to the outer shell so as to communicate with at least one second opening in the intermediate section of the outer shell.

The intermediate section of the outer shell may comprise a plurality of first openings which are aligned so as to define a first row of openings and a plurality of second openings which are aligned so as to define a second row of openings.

The compressed air plenum may be generally annular in shape and the vitiated air plenum may be generally annular in shape.

The duct structure may further comprise compressed air piping structure coupled to the compressed air plenum and the apparatus for separating a portion of oxygen from the compressed air, and vitiated air piping structure coupled to the vitiated air plenum and the apparatus for separating a portion of oxygen from the compressed air.

The gas turbine engine may further comprise a ring-shaped divider coupled to an inner surface of the intermediate section of the outer shell between the first and second rows of openings.

In accordance with a second aspect of the present invention, a gas turbine engine is provided comprising a compressor apparatus; a combustor apparatus; a turbine apparatus; an intermediate section; and duct structure. The compressor apparatus functions to compress air. The combustor apparatus receives compressed air and a fuel, combines the air and fuel to create an air/fuel mixture and ignites the air/fuel mixture to create combustion products. The turbine apparatus comprises a turbine assembly including a plurality of stationary vanes, a plurality of rotatable blades and a rotatable shaft and disc assembly coupled to the blades. The turbine apparatus receives the combustion products from the combustor apparatus such that the combustion products expand in the turbine apparatus causing the blades and shaft and disc assembly to rotate. The intermediate section is located between the combustor apparatus and the turbine apparatus and includes at least one first opening and at least one second opening. The duct structure is coupled to the intermediate section to receive at least a portion of the compressed air from the compressor apparatus through at least one first opening in the intermediate section, pass the compressed air to an apparatus for separating a portion of oxygen from the compressed air to produced vitiated compressed air and return the vitiated compressed air to the intermediate section via at least one second opening in the intermediate section.

DETAILED DESCRIPTION OF THE INVENTION

Figure 1:
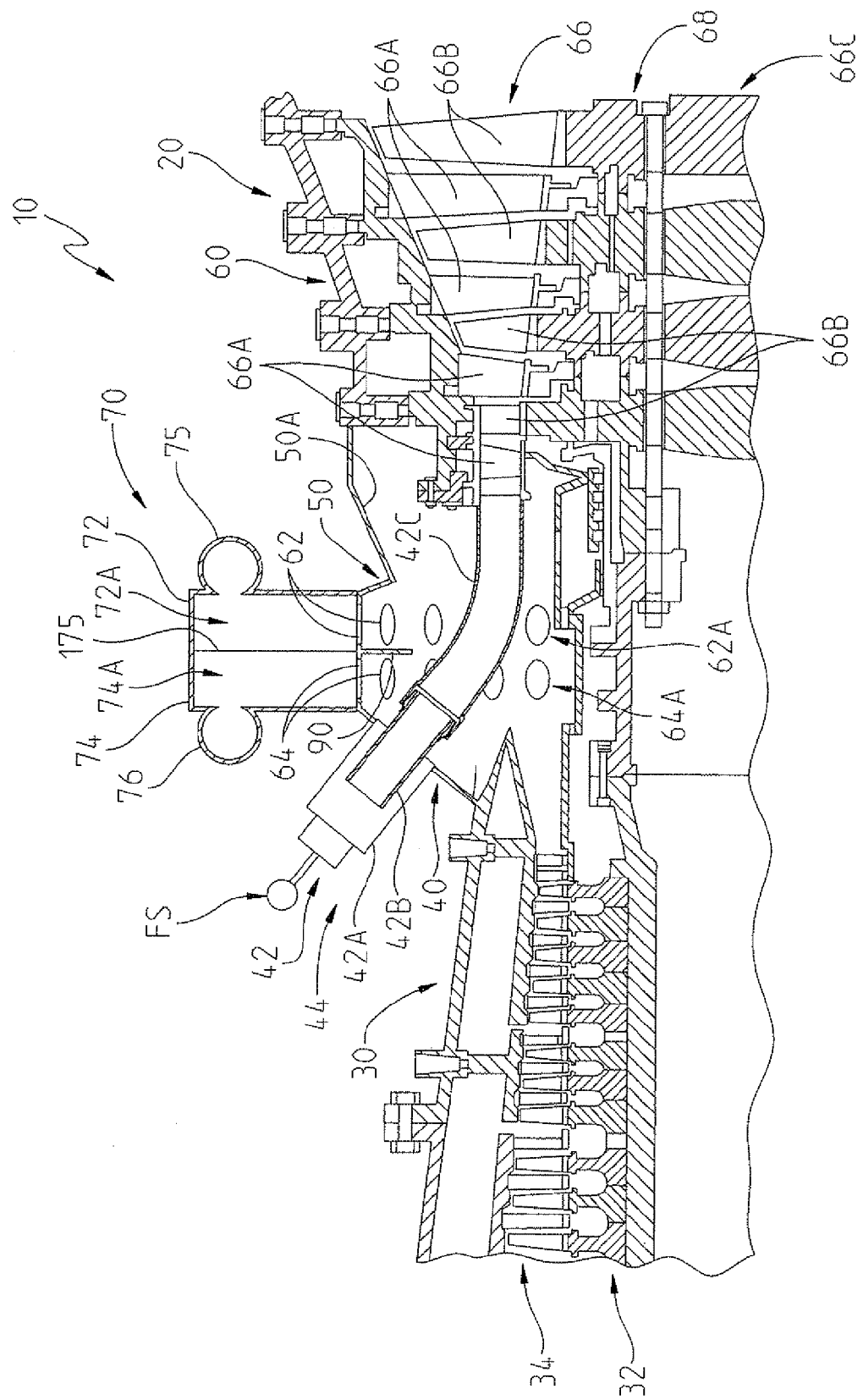
FIG. 1 is a side view in cross section of a portion of a gas turbine engine constructed in accordance with the present invention.
Figure 2:
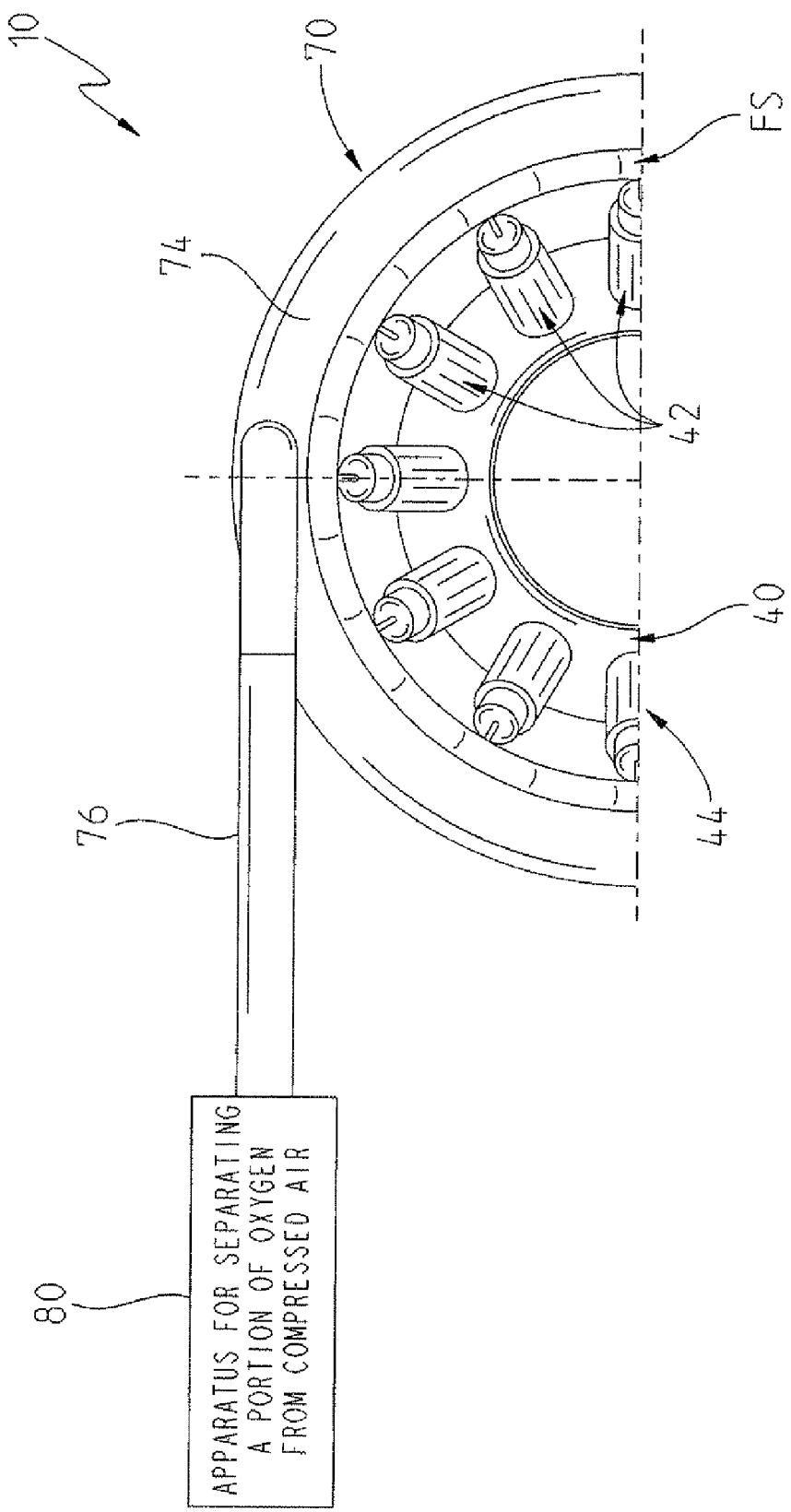
FIG. 2 is a view along an axial direction of a portion of the combustor apparatus and duct structure of the gas turbine engine illustrated in FIG. 1.
Figure 3:
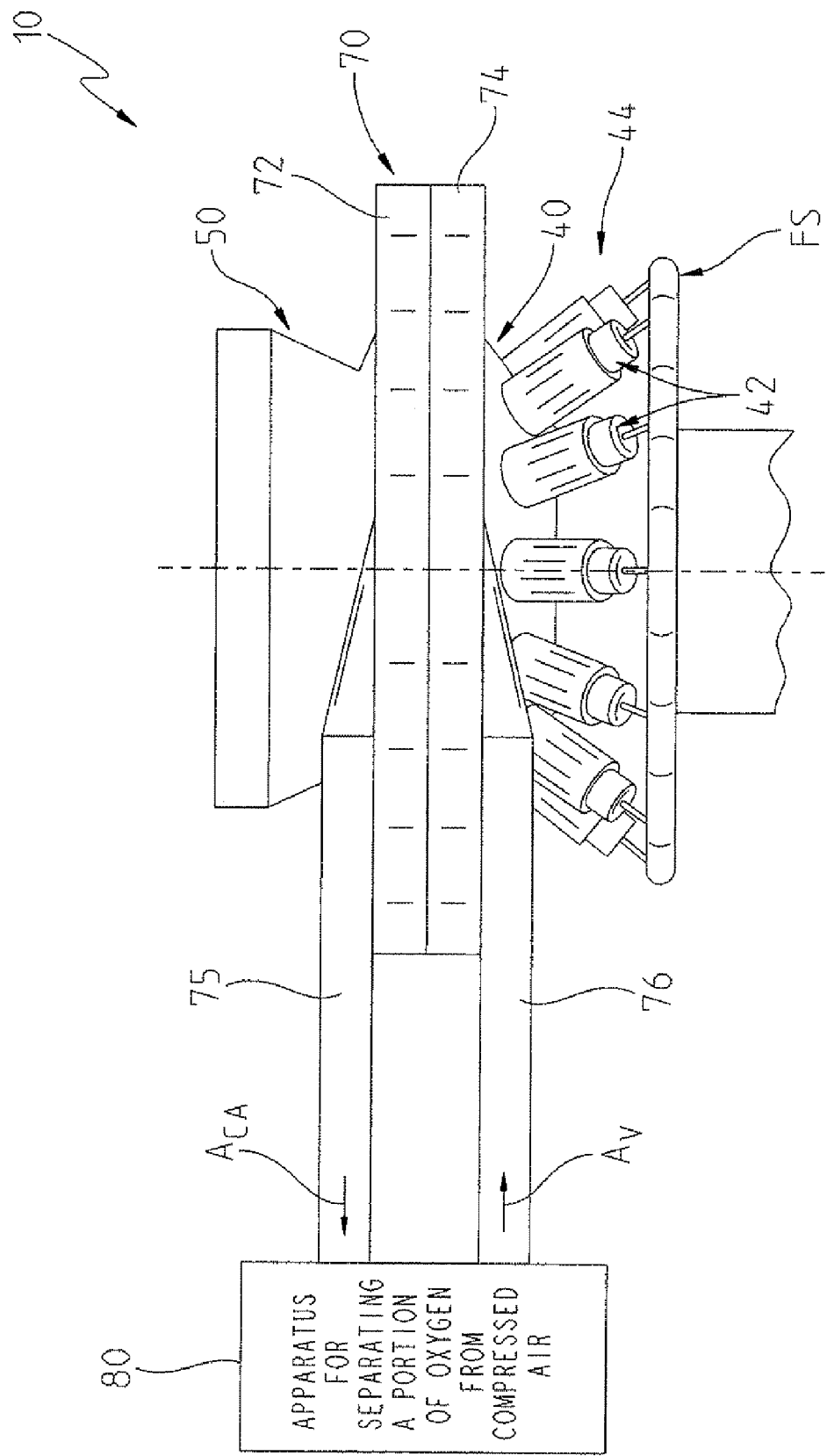
FIG. 3 is a top view of the duct structure, the intermediate section, the combustor apparatus and a portion of the compressor apparatus of the gas turbine engine illustrated in FIG. 1.

In the following detailed description of the preferred embodiment, reference is made to the accompanying drawings that form a part hereof, and which is shown by way of illustration, and not by way of limitation, a specific preferred embodiment in which the invention may be utilized and that changes may be made without departing from the spirit and scope of the present invention.

FIGS. 1-4 illustrate a portion of a gas turbine engine 10 constructed in accordance with the present invention. The gas turbine engine 10 comprises an outer shell 20 comprising a compressor section 30, a combustor section 40, an intermediate section 50 and a turbine section 60. The intermediate section 50 is located between the combustor section 40 and the turbine section 60 and includes, in the illustrated embodiment, a plurality of first openings 62 and a plurality of second openings 64. In the illustrated embodiment, the intermediate section 50 is generally cylindrical in shape. The plurality of first openings 62 are positioned generally side by side circumferentially about the intermediate section 50 so as to define a first row 62A of first openings 62. The plurality of second openings 64 are positioned generally side by side circumferentially about the intermediate section 50 so as to define a second row 64A of second openings 64.

The gas turbine engine 10 further comprises a compressor assembly 32, a plurality of combustor assemblies 42, a turbine assembly 66 and duct structure 70.

The compressor assembly 32 is located in the compressor section 30 and defines with the compressor section 30 a compressor apparatus 34 to compress air.

Figure 4:
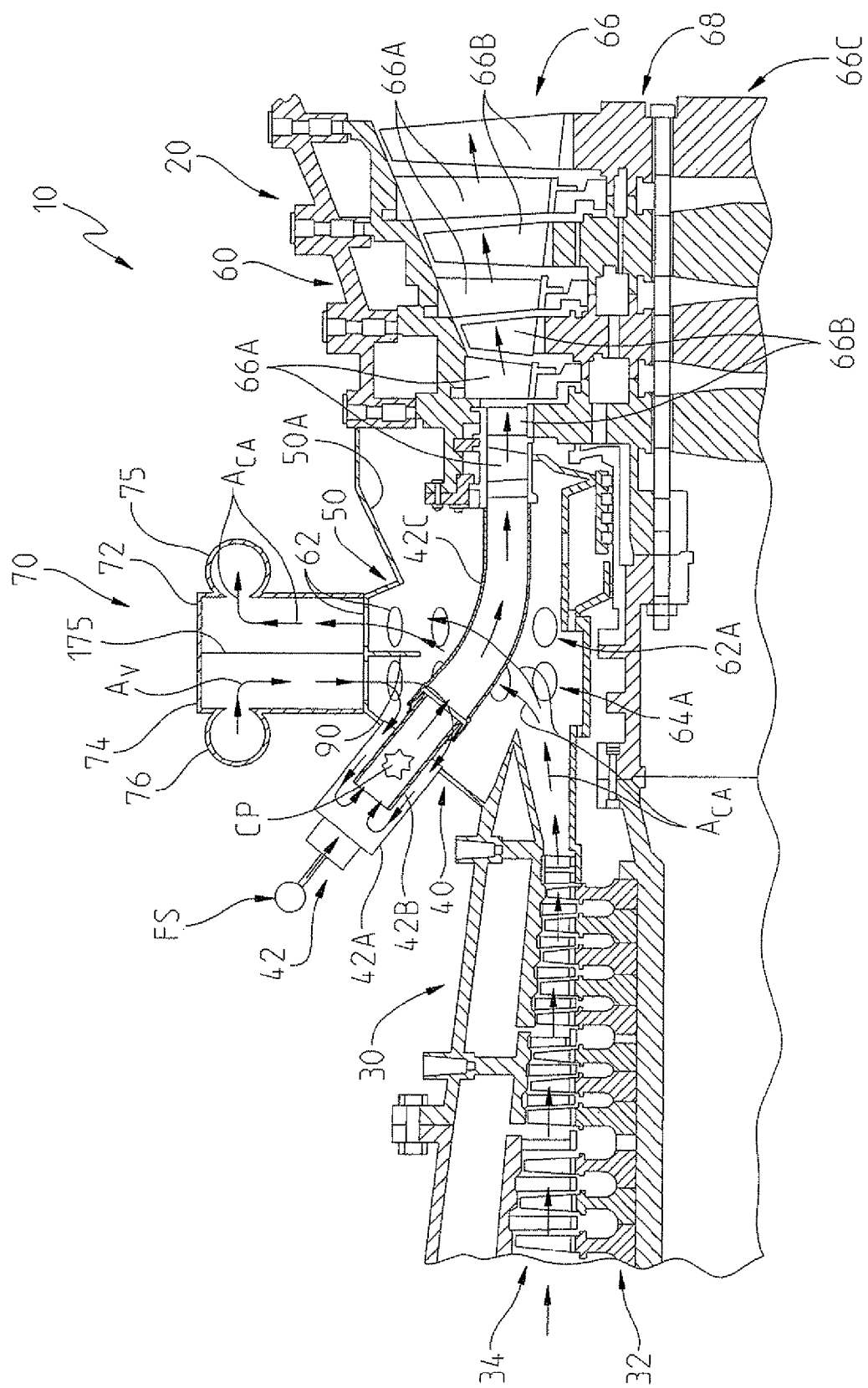
FIG. 4 is a view similar to FIG. 1 illustrating via arrows compressed air entering the duct structure and vitiated air leaving the duct structure.

The combustor assemblies 42 are circumferentially spaced about and coupled to the combustor section 40 to define with the combustor section 40 a combustor apparatus 44 to receive compressed air and a fuel from a fuel source FS, combine the air and fuel to create an air/fuel mixture and ignite the air/fuel mixture to create combustion products CP, see FIG. 4. Each combustor assembly 42 may comprise a combustor casing 42A, a plurality of nozzles (not shown) extending through the combustor casing 42A and into a liner 42B where combustion takes place, and a transition duct 42C through which the combustion products travel to the turbine assembly 66, see FIGS. 1 and 4.

The turbine assembly 66 comprises a plurality of stationary vanes 66A, a plurality of rotatable blades 66B and a rotatable shaft and disc assembly 66C (the shaft of the assembly 66C is not shown in FIGS. 1 and 4) coupled to the blades 66B. The turbine assembly 66 is located in the turbine section 60 to define with the turbine section 60 a turbine apparatus 68 to receive the combustion products CP from the transition ducts 42C of the combustor apparatus 44 such that the combustion products CP expand in the turbine apparatus 68 causing the blades 66B and shaft and disc assembly 66C to rotate.

The duct structure 70 comprises a compressed air plenum 72 having a generally annular shape so as to define a generally annular inner cavity 72A. The compressed air plenum 72 is fixedly coupled to the outer shell 20 so as to communicate with the first openings 62 in the intermediate section 50 of the outer shell 20. The duct structure 70 further comprises a vitiated air plenum 74 having a generally annular shape so as to define a generally annular inner cavity 74A. The vitiated air plenum 74 is fixedly coupled to the outer shell 20 so as to communicate with the second openings 64 in the intermediate section 50 of the outer shell 20. In the illustrated embodiment, the compressed air plenum 72 and the vitiated air plenum 74 share a common wall 175, see FIGS. 1-4.

Compressed air generated by the compressor apparatus 34 and represented by arrows $A_{CA}$ in FIG. 4, leaves the compressor apparatus 34 and enters the intermediate section 50. After entering the intermediate section 50, a portion of the compressed air $A_{CA}$, for example, between about 40% to about 60% by weight of the compressed air entering the compressor apparatus 34, passes through the first openings 62 and enters into the compressed air plenum 72. A ring-shaped divider 90 is coupled to an inner surface 50A of the intermediate section 50 of the outer shell 12 and positioned between the first and second rows 62A and 64A of the first and second openings 62, 64. As is illustrated in FIG. 4, the natural flow path of the compressed air $A_{CA}$ from the compressor apparatus 34 is in a direction towards the first openings 62 in the intermediate section 50. Hence, the divider 90 is sufficient to prevent a substantial portion of the compressed air $A_{CA}$ coming directly from the compressor apparatus 34 from mixing with vitiated air, described below, returning through the second openings 64. The remaining compressed air $A_{CA}$, i.e., the compressed air that does not pass through the first openings 62, is deflected by the inner surface 50A of the intermediate section 50 back towards the combustor assemblies 42 so as to pass directly from the intermediate section 50 into the plurality of combustor assemblies 42.

After entering the compressed air plenum 72, the compressed air $A_{CA}$ moves through compressed air piping structure 75 and into an apparatus 80 for separating a portion of oxygen from the compressed air. The compressed air piping structure 75 defines a portion of the duct structure 70 and comprises one or more pipes coupled to the compressed air plenum 72 and the apparatus 80 for separating a portion of oxygen from the compressed air.

The apparatus 80 for separating a portion of oxygen from the compressed air may comprise an ion transport membrane system as described in U.S. Pat. No. 5,657,624, which has previously been incorporated by reference herein. Between about 20% to about 60% by weight of oxygen may be removed from the air by the apparatus 80. The air, after having a portion of its oxygen removed via the apparatus 80, is referred to herein as "vitiated air." The removed oxygen is stored and may be used later for purposes such as increasing the reaction rates in steelmaking and other metals refining and fabrication processes, in chemicals, pharmaceuticals, petroleum processing, glass and ceramic manufacture, pulp and paper manufacture, the treatment of municipal and industrial effluents, and for heath care uses in hospitals.

The duct structure 70 further comprises vitiated air piping structure 76 coupled to the vitiated air plenum 74 and the apparatus 80 for separating a portion of oxygen from the compressed air. The vitiated air piping structure 76 may comprises one or more pipes coupled to the vitiated air plenum 74 and the apparatus 80 for separating a portion of oxygen from the compressed air.

The vitiated air, designated by arrow $A_V$ in FIG. 4, leaves the apparatus 80 and enters into the vitiated air piping structure 76. From the air piping structure 76, the vitiated air $A_V$, enters the vitiated air plenum 74, passes through the second openings 64 in the intermediate section 50 so as to enter the intermediate section 50 and then passes into the combustor assemblies 42.

It is believed that the duct structure 70 of the present invention can be incorporated into many existing gas turbine engine designs without requiring the intermediate section to be lengthened in an axial direction. It is further believed that the duct structure 70 of the present invention can be incorporated into many existing turbine engine designs without requiring a rotor shaft (not shown), extending between and shared by the compressor assembly 32 and the turbine assembly 66, to be lengthened.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine comprising:
    an outer shell having a compressor section, a combustor section, an intermediate section and a turbine section, said intermediate section being located between said combustor section and said turbine section and including at least one first opening and at least one second opening;
    a compressor assembly located in said compressor section to define with said compressor section a compressor apparatus to compress air;
    at least one combustor assembly coupled to said combustor section to define with said combustor section a combustor apparatus to receive compressed air and a fuel, combine the air and fuel to create an air/fuel mixture and ignite the air/fuel mixture to create combustion products;
    a turbine assembly comprising a plurality of stationary vanes, a plurality of rotatable blades and a rotatable shaft and disc assembly coupled to said blades, said turbine assembly being located in said turbine section to define with said turbine section a turbine apparatus to receive the combustion products from said combustor apparatus such that the combustion products expand in said turbine apparatus causing said blades and shaft and disc assembly to rotate;
    duct structure coupled to said intermediate section to receive at least a portion of the compressed air from said compressor apparatus through said at least one first opening in said intermediate section, pass the compressed air to an apparatus for separating a portion of oxygen from the compressed air to produce vitiated compressed air and return the vitiated compressed air to said intermediate section via said at least one second opening in said intermediate section; and
    a ring-shaped divider coupled to an inner surface of said intermediate section of said outer shell between said at least one first opening and said at least one second opening, said ring-shaped divider extending from said inner surface of said intermediate section to a location between said inner surface and a transition duct through which the combustion products travel to said turbine assembly so as to allow both compressed air and vitiated compressed air into said combustor apparatus to combust therein.

2. The gas turbine engine as set forth in claim 1, wherein said duct structure comprises a compressed air plenum coupled to said outer shell so as to communicate with said at least one first opening in said intermediate section of said outer shell and a vitiated air plenum coupled to said outer shell so as to communicate with said at least one second opening in said intermediate section of said outer shell.

3. The gas turbine engine as set forth in claim 2, wherein said intermediate section of said outer shell comprises a plurality of first openings which are aligned so as to define a first row of openings and a plurality of second openings which are aligned so as to define a second row of openings.

4. The gas turbine engine as set forth in claim 3, wherein said compressed air plenum is generally annular in shape and said vitiated air plenum is generally annular in shape.

5. The gas turbine engine as set forth in claim in claim 4, wherein said duct structure further comprises compressed air piping structure coupled to said compressed air plenum and the apparatus for separating a portion of oxygen from the compressed air, and vitiated air piping structure coupled to said vitiated air plenum and the apparatus for separating a portion of oxygen from the compressed air.

6. The gas turbine engine as set forth in claim 1, wherein said ring-shaped divider is configured such that:
    about 40-60% of the compressed air entering said intermediate section passes through said at least one first opening to the apparatus for separating a portion of oxygen from the compressed air; and
    about 40-60% of the compressed air entering said intermediate section passes directly to said combustor apparatus without passing to the apparatus for separating a portion of oxygen from the compressed air.

7. A gas turbine engine comprising:
    a compressor apparatus to compress air;
    a combustor apparatus to receive compressed air and a fuel, combine the air and fuel to create an air/fuel mixture and ignite the air/fuel mixture to create combustion products;
    a turbine apparatus comprising a turbine assembly including a plurality of stationary vanes, a plurality of rotatable blades and a rotatable shaft and disc assembly coupled to said blades, said turbine apparatus to receive the combustion products from said combustor apparatus such that the combustion products expand in said turbine apparatus causing said blades and shaft and disc assembly to rotate;
    an intermediate section located between said combustor apparatus and said turbine apparatus and including at least one first opening and at least one second opening;
    duct structure coupled to said intermediate section to receive a first portion of the compressed air from said compressor apparatus through said at least one first opening in said intermediate section, pass the first portion of compressed air to an apparatus for separating a portion of oxygen from the first portion of compressed air to produce vitiated compressed air and return the vitiated compressed air to said intermediate section via said at least one second opening in said intermediate section, the vitiated compressed air passing to said combustor apparatus; and
    structure provided in said intermediate section for allowing the first portion of compressed air to pass into said at least one first opening while allowing a second portion of the compressed air to pass directly to said combustor apparatus to combust therein without passing to the apparatus for separating a portion of oxygen from the first portion of compressed air.

8. The gas turbine engine as set forth in claim 7, wherein said duct structure comprises a compressed air plenum coupled to said intermediate section so as to communicate with said at least one first opening in said intermediate section and a vitiated air plenum coupled to said intermediate section so as to communicate with said at least one second opening in said intermediate section.

9. The gas turbine engine as set forth in claim 8, wherein said intermediate section comprises a plurality of first openings which are aligned so as to define a first row of openings and a plurality of second openings which are aligned so as to define a second row of openings.

10. The gas turbine engine as set forth in claim 9, wherein said compressed air plenum is generally annular in shape and said vitiated air plenum is generally annular in shape.

11. The gas turbine engine as set forth in claim 10, wherein said duct structure further comprises compressed air piping structure coupled to said compressed air plenum and vitiated air piping structure coupled to said vitiated air plenum.

12. The gas turbine engine as set forth in claim 7, wherein said structure provided in said intermediate section for allowing the first portion of compressed air to pass into said at least one first opening while allowing a second portion of the compressed air to pass directly to said combustor apparatus comprises a ring-shaped divider coupled to an inner surface of said intermediate section between said at least one first opening and said at least one second opening.

13. The gas turbine engine as set forth in claim 12, wherein said ring-shaped divider extends from said inner surface of said intermediate section to a location between said inner surface and a transition duct through which the combustion products travel to said turbine assembly.

14. The gas turbine engine as set forth in claim 7, wherein said structure provided in said intermediate section for allowing the first portion of compressed air to pass into said at least one first opening while allowing a second portion of the compressed air to pass directly to said combustor apparatus is configured such that:
about 40-60% of the compressed air entering said intermediate section passes through said at least one first opening to the apparatus for separating a portion of oxygen from the first portion of compressed air; and
about 40-60% of the compressed air entering said intermediate section passes directly to said combustor apparatus without passing to the apparatus for separating a portion of oxygen from the first portion of compressed air.

15. A gas turbine engine comprising:
an outer shell having a compressor section, a combustor section, an intermediate section and a turbine section, said intermediate section being located between said combustor section and said turbine section and including a row of first openings and a row of second openings;
a compressor assembly located in said compressor section to define with said compressor section a compressor apparatus to compress air;
at least one combustor assembly coupled to said combustor section to define with said combustor section a combustor apparatus to receive compressed air and a fuel, combine the air and fuel to create an air/fuel mixture and ignite the air/fuel mixture to create combustion products;
a turbine assembly comprising a plurality of stationary vanes, a plurality of rotatable blades and a rotatable shaft and disc assembly coupled to said blades, said turbine assembly being located in said turbine section to define with said turbine section a turbine apparatus to receive the combustion products from said combustor apparatus such that the combustion products expand in said turbine apparatus causing said blades and shaft and disc assembly to rotate;
duct structure coupled to said intermediate section to receive a first portion of the compressed air from said compressor apparatus through said row of first openings in said intermediate section, pass the first portion of compressed air to an apparatus for separating a portion of oxygen from the first portion of compressed air to produce vitiated compressed air and return the vitiated compressed air to said intermediate section via said row of second openings in said intermediate section; and
structure provided in said intermediate section for allowing the first portion of compressed air to pass into said row of first openings while allowing a second portion of the compressed air to pass directly to said combustor apparatus to combust therein without passing to the apparatus for separating a portion of oxygen from the first portion of compressed air.

16. The gas turbine engine as set forth in claim 15, wherein said duct structure comprises a generally annular compressed air plenum coupled to said outer shell so as to communicate with said at least one first opening in said intermediate section of said outer shell and a generally annular vitiated air plenum coupled to said outer shell so as to communicate with said at least one second opening in said intermediate section of said outer shell.

17. The gas turbine engine as set forth in claim in claim 16, wherein said duct structure further comprises compressed air piping structure coupled to said compressed air plenum and the apparatus for separating a portion of oxygen from the compressed air, and vitiated air piping structure coupled to said vitiated air plenum and the apparatus for separating a portion of oxygen from the compressed air.

18. The gas turbine engine as set forth in claim 15, wherein said structure provided in said intermediate section for allowing the first portion of compressed air to pass into said row of first openings while allowing a second portion of the compressed air to pass directly to said combustor apparatus comprises a ring-shaped divider coupled to an inner surface of said intermediate section between said row of first openings and said row of second openings.

19. The gas turbine engine as set forth in claim 18, wherein said ring-shaped divider extends from said inner surface of said intermediate section to a location between said inner surface and a transition duct through which the combustion products travel to said turbine assembly.

20. The gas turbine engine as set forth in claim 18, wherein said ring-shaped divider is configured such that:
about 40-60% of the compressed air entering said intermediate section passes through said row of first openings to the apparatus for separating a portion of oxygen from the compressed air; and
about 40-60% of the compressed air entering said intermediate section passes directly to said combustor apparatus without passing to the apparatus for separating a portion of oxygen from the compressed air.

* * * * *